United States Patent [19]

Vilatte

[11] 4,293,954
[45] Oct. 6, 1981

[54] RECEIVING SYSTEM FOR TRANSMITTING INFORMATION TRANSMITTED BY A MOBILE TRANSMITTER TO A CENTRAL STATION

[75] Inventor: Jean-Pierre Vilatte, Villebon, France

[73] Assignee: U.S. Philips Corporation, New York, N.Y.

[21] Appl. No.: 2,271

[22] Filed: Jan. 10, 1979

[30] Foreign Application Priority Data

Jan. 13, 1978 [FR] France .................. 78 00894

[51] Int. Cl.³ .............................................. H04B 7/26
[52] U.S. Cl. ............................................ 455/54; 455/58
[58] Field of Search ............. 325/51, 53, 56, 57, 325/64; 455/49, 52, 53, 54, 56–58

[56] References Cited

U.S. PATENT DOCUMENTS

| | | | |
|---|---|---|---|
| 2,589,158 | 3/1952 | Staples | 325/57 |
| 2,734,131 | 2/1956 | Magnuski | 325/51 |
| 2,870,326 | 1/1959 | Sterner | 325/53 |
| 2,883,522 | 3/1959 | Brosh | 325/57 |

*Primary Examiner*—Marc E. Bookbinder
*Attorney, Agent, or Firm*—William J. Streeter; Bernard Franzblau

[57] ABSTRACT

A receiving system for transmitting information from a mobile transmitter to a central station comprising several sub-stations which are connected to the central station by means of a common line. Several stations can receive the signal from the mobile station but only the sub-station at which the reception is best transmits the information from the mobile station to the central station.

8 Claims, 6 Drawing Figures

RECEIVING SYSTEM FOR TRANSMITTING INFORMATION TRANSMITTED BY A MOBILE TRANSMITTER TO A CENTRAL STATION

The invention relates to a receiving system for transmitting information from a mobile station to a fixed central station via one sub-station out of a plurality of sub-stations, this sub-station being connected to the central station by means of a transmission line, each sub-station comprising a radio receiver which has its output coupled to the transmission line.

The invention is, for example, used for the transmission of information between a train and a central station, the plurality of sub-stations being arranged along the railway.

In such a system several sub-stations can simultaneously receive the mobile station. The received information is transmitted to the central station with phase shifts which depend on the distance between the sub-stations and the central station and on the manner in which the sub-station output is connected to the transmission line. Namely, if a symmetrical two-wire line is used as the transmission line the sub-station output can be connected to the transmission line in two ways and these two ways of connection produce mutual 180° phase shifts. These phase shifts render the information transmitted by the mobile transmitter unintelligible and useless on receipt at the central station. It is therefore important that only one single sub-station forwards the information, transmitted by the mobile transmitter, on to the central station.

French patent application No. 2 332 504 discloses a system of this type which is coupled to a transmission system for transmitting information from the central station to the mobile station in such a manner that a transmitting station corresponds to each one of the sub-stations. In addition, the mobile station comprises means for receiving only the information originating from one of the transmitting stations and the system has been designed so that only the sub-station corresponding with this transmitting station transmits the information to the central station.

This known system has several drawbacks. The first drawback is the fact that it relates to a transmission system comprising several transmitting stations, which operate at different frequencies, so that there is an excessive accumulation of frequencies. A second drawback is that the system requires many components, low-frequency filters, low-frequency signal generators for the transmitting and sub-stations as well as for the mobile station.

It is an object of the invention to provide a receiving system which does not have these drawbacks, that is to say a system operating independent of a transmitting station, which does not require any modification of the mobile station with respect to a normal transmitter and which requires only a limited number of components for the sub-stations.

According to the invention a receiving system of the type defined in the opening paragraph is characterized in that each receiving station comprises a device for measuring the quality of the received signal, this device comprising an output connected to a first input terminal of a delayed-signal generator, this generator comprising an output terminal coupled to the transmission line for applying a rest condition to the remaining sub-stations, the output terminal furthermore being connected to an input of the receiving circuit for applying a signal for releasing the receiving circuit, the delayed-signal generator having a second input terminal coupled to the transmission line for applying a rest condition signal, generated by one of the other sub-stations to the sub-station.

It should be noted that it is known per se from French patent application 2,347,839 to use a time delay as a derived measure of the quality of reception. In this known system the information transmitted by the mobile station is received by the sub-stations. Each one of the sub-stations transmits this information to the central station via a separate channel and the signals in each one of the channels is delayed depending on the quality of the reception. Only the signal having the shortest time delay is processed further. This system has the drawback that each sub-station requires a channel and that the information from the mobile station is transmitted by the sub-stations to the central station, selection not taking place until the information is received in the central station.

The invention will be further explained by way of non-limitative example with reference to the accompanying drawings in which.

Figure 1:
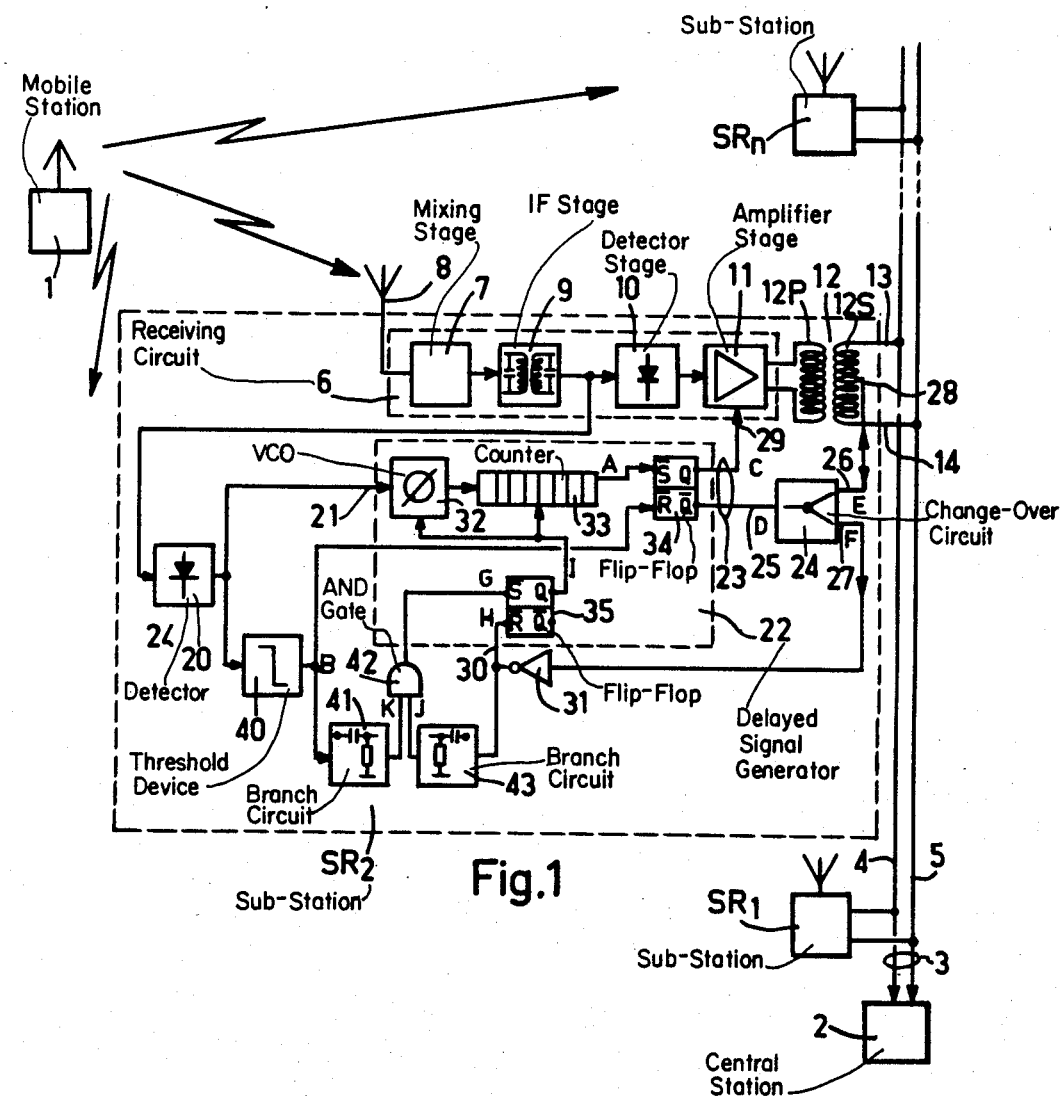
FIG. 1 shows a receiving system according to the invention.

Referring to FIG. 1, reference numeral 1 denotes a mobile station which can be moved along a pre-determined path. This station 1 transmits information by radio waves to a fixed central station 2. Several sub-stations SR 1, SR 2, ... SRn are arranged along the track so that, irrespective of the position of the mobile station, at least one of the sub-stations can receive the information transmitted by the mobile stations for transfer to the central station 2 via a transmission line 3 consisting of two wires 4 and 5. All sub-stations SR 1, SR 2 ... SR n are of the same construction with the drawing only showing the details of station SR 2. The station SR 2 consists mainly of a receiving circuit 6 consisting of several cascade-arranged stages. The first stage 7 is a mixing stage which converts the signal received by the aerial 8, which is connected to the input thereof, into a signal having a lower carrier. A second intermediate-frequency stage 9 amplifies the signal having the lower carrier. A third stage 10 detects the information in the signal (in this example this stage is a phase discriminator). The detected infomation is still further amplified by a fourth stage 11, the output of which is connected to the line 3. It should be noted that the connection between the output of the fourth stage (amplifier) and the line 3 is realised by means of a transformer 12, whose primary winding 12 P is connected to the output of the stage 11. The outputs 13 and 14 of the secondary winding 12 S are connected to the wires 4 and 5, respectively.

For this type of system it is therefore important that the information transmitted by the mobile station is transferred by one signle sub-station. If the distance between the two stations is large, the information supplied via the line 3 arrives with a phase shift which increases with the distance. It is possible that the information arriving at the central station 2 has become useless. Unwanted phase shifts may be produced if no precautions are taken for the connection of the ends 13 and 14 of the secondary winding to the line 3. The ends 13 and 14 of the secondary winding can be connected to the wires 4 and 5, respectively, but their connection can also be reversed, that is to say to the wires 5 and 4, respectively, there being a phase shift of 180° between these two means of connection. The drawback resulting from these two means of connection, which is serious for the case where the stations are very remote from one another, remains even if this distance is smaller. To obviate the drawback in the lastmentioned case, each wire of the line should be marked and the connection of the secondary winding to the line should always be effected in the same manner. This, however, renders the implementation of a system and the maintenance thereof very intricate. To avoid these problems, only one sub-station should be allowed to transmit information to the central station 2.

According to the invention each sub-station comprises a device (expressed in the Figure by reference numeral 20 for the station SR 2) for measuring the quality of the received signal. The device 20 has an output connected to the first input terminal 21 for receiving a signal for controlling the time delay of a delayed-signal generator 22. The output terminal 23 of this generator 22 is coupled to the transmission line 3 via a change-over circuit 24, shown in detail in FIG. 2 and comprising three terminals 25, 26 and 27 with the input terminal 25 connected to the output 23. The terminal 26 of switching circuit 24 is connnected to a centre tap 28 of the secondary winding 12 S of the transformer 12. The output 23 is also connected to an input 29 for applying the release signal to the receiving circuit. The delayed-signal generator 22 comprises a second input terminal 30 for receiving a rest condition signal. This rest condition signal is transferred to the other sub-stations via transmission line 3 and the centre tap 28 which is connected to the change-over circuit 24. Each sub-station further comprises an inverter device 31 whose input is connected to the terminal 27 of the change-over circuit 24.

In broad outlines such a system operates as follows:

At a certain moment mobile station 1 starts transmitting. This transmission can be received by several sub-stations. The output signal of the measuring device 20 is higher the better the quality, e.g. the amplitude, of the received signal, so that in the sub-station in which the reception of the mobile station 1 is superior to the reception in the other sub-stations the signal supplied by device 20 will be of the highest quality. A high output signal of device 20 corresponds with a small delay of the generator 22. The generator of the sub-station where the reception was best will therefore be the first station able to supply a pulse to the line. This causes the receiving circuit of this station to be released and the generators in the other sub-stations to be adjusted to the rest condition.

A receiving circuit comprising an input 29 for the relase signal can be implemented by means of a stage 11 which comprises an input which can be connected to the output of an attenuation control circuit. In the English literature this circuit is better known by the name "squelch circuit". The device 20 for measuring the quality of the received signal consists of an amplitude detector whose input is connected to the output of the amplifying stage 9. This device produces at its output a signal whose voltage is greater according as the amplitude of the carrier received by the aerial 8 is greater. The generator 22 comprises a voltage-controlled oscillator 32. The frequency of this oscillator is set at a minimum when the control voltage is not so high and becomes greater in the case of a higher control voltage. A counter 33 counts the pulses produced by this oscillator 32. The "end-of-count signal" of the counter 33 appears at the output A for the carry-over signal, the output being connected to the input $\overline{S}$ of a flip-flop 34 of the RS type. The two wires of this flip-flop which are connected to the outputs Q and $\overline{Q}$, constitute the output 23 of the generator 22. The reset input for resetting the counter 33 to zero and the inhibit input of the oscillator 32 are connected to the output Q of a flip-flop 35, which has for its function the registration of a signal for adjusting the generator 22 to the rest condition, which signal appears at the input 30. Input 30 is connected to the input $\overline{R}$ of the flip-flop 35. The output of the device 20 is also connected to the input of a threshold device 40 which produces a logic signal at its output, which signal has either the value "0" for an input signal which is below the threshold, or the value "1" for an input signal exceeding the threshold. The output of this device is connected to the input $\overline{R}$ of the flip-flop 34 and to a first input of an AND-gate 42 via a branch circuit 41, which is shown in detail in FIG. 3. A second input of the AND-gate is connected to a branch circuit 43 which is implemented in the same manner as the circuit 41. Circuit 43 is coupled to the output of the inverter device 31. The output of this AND-gate 42 is connected to the input $\overline{S}$ of the flip-flop 35.

Figure 2:
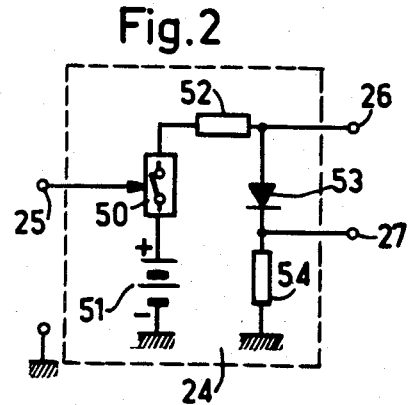
FIG. 2 shows a change-over circuit forming a part of the system shown in FIG. 1.

The change-over circuit 24, shown in detail in FIG. 2, comprises an interrupter 50 which opens or closes in response to a logic signal applied to the input 25. If the logic signal has the value "0", the interrupter is closed and if this value is "1" the interrupter is opened. One end of the interrupter 50 is connected to the positive pole of a voltage source 51, which produces a voltage which corresponds with the logic signal havig the value 1. The other end of the interrupter is connected to terminal 26 via a resistor 52. The connection between the terminals 26 and 27 is effected by the anode-cathode path of a diode 53. The resistor 54 is arranged between the cathode of the diode 53 and ground.

When the interrupter 50 is closed a logic signal having the value "1" is transmitted at the terminal 26. This signal appears at the terminal 27. When the interrupter is open, a logic signal is obtained at terminal 27 which is the same as the signal present at the terminal 26. Consequently, the terminal 27 has the same logic state as that of the line 3. The interrupter 50 may consist of a switching transistor which has its base connected to the input 25 and its emitter connected to the positive pole of the source 51 and its collector to the input 26 via a resistor 52.

It should be noted that use is made of the fact that the line 3 consists of two wires which, as regards the alternating current, are symmetrically used, so that the two wires can carry different logic voltages with respect to ground. This is obtained by applying different logic voltages to the centre tap 28. Conversely, it is possible to detect these voltages by measuring the difference in potential between the point 28 and ground. So the transfer of the signal of the generator 22 does not require any additional wires.

Figure 3:
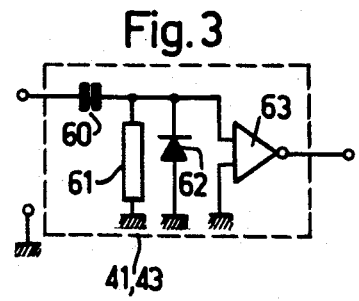
FIG. 3 shows the branch circuit which forms a part of the system shown in FIG. 1.

The branch circut 41 or 43, shown in detail in FIG. 3, comprises a capacitor 60, one plate of which constitutes the input of the circuit. The other plate is connected to the end of a resistor 61, to the cathode of a diode 62 as well as to the input of an inverter-amplifier. The output of the inverter-amplifier 63 constitutes the output of the circuit 41 or 43. This circuit produces a pulse which changes from a logic "1" to a logic "0", and changes back to "1" when the signal at the input thereof changes from the logic value "0" to "1".

Figure 4:
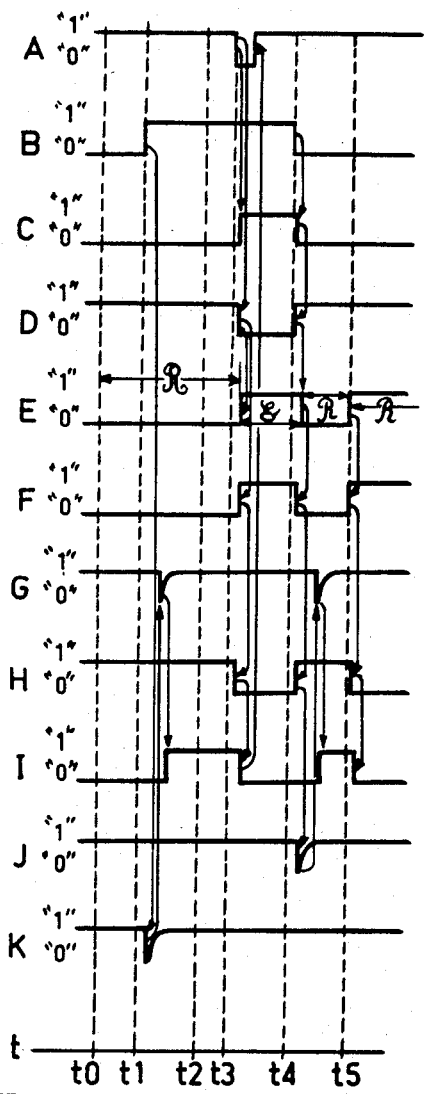
FIGS. 4 and 5 are time diagrams which are used to explain the operation of the system shown in FIG. 1.
Figure 5:
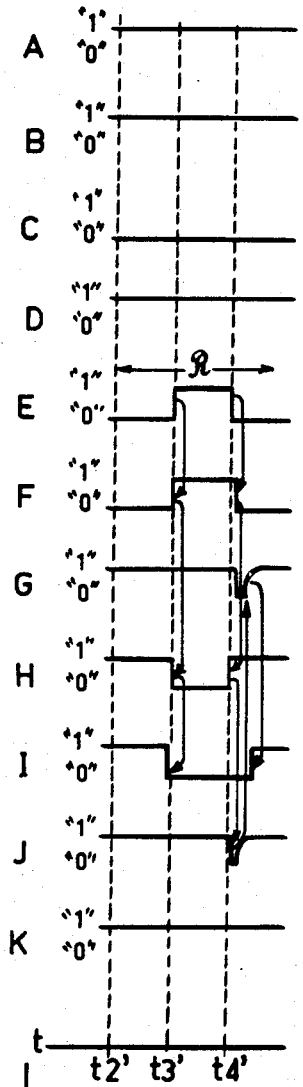

For an understanding of the detailed operation of the system according to the invention the different logic signals, whose reference numerals are found in FIG. 1, are shown in FIGS. 4 and 5.

The signal A is the carry signal of the counter 33 which is applied to the input $\overline{S}$ of the flip-flop 34.

The signal B is the output signal of the threshold device 40, which represents the quality of the received signal.

The signals C and D are signals present at the outputs Q and $\overline{Q}$ of the flip-flop 34.

The signals E an F are the signals present at the terminals 26 and 27 of the change-over circuit 24.

The signals G and H are the signals applied to the inputs $\overline{S}$ and $\overline{R}$ of the flip-flop 35 and the signal I is the output signal of this flip-flop.

The signals J and K are the output signals of the branch circuits 43 and 41, respectively.

Let FIG. 4 be considered first. Operation is assumed to start from an initial moment t0 at which the signals C and I at the outputs Q of the flip-flops 34 and 35 have the value "0". The wires 4 and 5 have a potential of O volt, which corresponds to the logic value "0". So the signals E and F have the logic value "0". The generator 22 is in the rest condition, that is to say the oscillator 32 does not oscillate and the counter 33 has been set to its lowest position, the carry signal A has the value "1". The interrupter 50 is open, denoted by symbol ⌒ in FIG. 4 and at the line through the signal E. When the interrupter 50 is open the change-over circuit has been adjusted, so to speak, to the receiving position, the signal F being equal to the signal E.

At the moment t1 the detected signal becomes rather strong, the signal B assumes the value "1" so that the flip-flops 34 and 35 are set, as the signals A and B on one end and G and H on the other end have the value "1". Because the signal B changes from "0" to "1" the signal K at the output of the branch circuit 41 changes its polarity a few times, that is to say the value "1" changes to the value "0" and resumes thereafter the value "1". The signal G imitates this signal and the transition to zero of this pulse causes the flip-flop 35 to change state, the signal I then assumes the value "1". The generator 22 is released, we are at the instant t2. The frequency of the signal produced by the oscillator is determined by the amplitude of the voltage supplied by the device 20. The time the generator 22 needs for producing the pulse depends on the period of time during which the counter 33 counts, so on the frequency of the oscillator 32. Let it be assumed that it is the station SR 2 which receives the strongest signal at a certain moment. At the instant t3 signal A then assumes the value "0" which implies that the signal C assumes the value "1", so that the receiving circuit 6 is released and can transmit, via the line 3, the information received by the aerial 8. The signal D is complementary to the signal C, the interrupter 50 (see FIG. 2) is closed, and the circuit 24 has been adjusted to the transmitting position. This is indicated by the symbol E in FIG. 4. The signals E and F assume the value "1" and the signal E will be transmitted to all other sub-stations to prevent them from supplying the information on line 3, in a manner which will be described hereafter. The signal F adjusts the flip-flop 35 to the non-conducting state via the inverter 31, in response whereto the signal I assumes the value "0" causing the generator 22 to be adjusted to its rest condition. The signal A then resumes its original value "1", which does not change the state of flip-flop 34.

As long as the station SR 2 receives the signal transmitted by the station 1, in the correct conditions, so B=1, only station SR 2 will transmit the information of mobile station 1 to central station 2. Should, however, these conditions deteriorate, signal B assumes the value "0". This case is represented at the instant t4. Because signal B assumed the value "0" at t4 the flip-flop 34 changes state, signal C assumes the value "0" in response to which the receiving circuit 6 is blocked, signal D assumes the value "1" causing the circuit 24 to be adjusted to the receiving condition and signal F assumes the value "0" so that the flip-flop changes state. If the station SR 2 no longer receives in the correct circumstances, another station has a better reception. Therefore, at the instant t5 the signal E, circuit 24 being in the receiving condition, assumes the value "1"; the values of the signals F, G and H change, which implies that the flip-flop 35 changes state in response to which the generator 22 is adjusted to the rest condition.

FIG. 5 shows the situation defined at instant t2 in FIG. 4. This instant is denoted by t2' in FIG. 5. It is now assumed that at the instant t3' a signal having the value "1" is received at the level of the station SR 2. The signal F also assumes this value and the signal H assumes the value "0" which implies that the flip-flop 35 changes state and that in response thereto signal I becomes equal to "0". The generator 22 has been adjusted to the rest condition.

Now the situation will be described wherein, starting from these circumstances, the signal E assumes the value "0" at the instant t4', which implies that all stations which can receive the transmission of the mobile station must examine the quality of the received signal. As explained above the change in the value of the signal "E" automatically causes the value of the signals F, G and H to change. The signal J at the rising edge of the signal H starts pulsating which will be transmitted by the gate 42 so that the flip-flop 35 changes state. The signal I then assumes the value "1" so that the generator 22 is capable of operation again.

Figure 6:
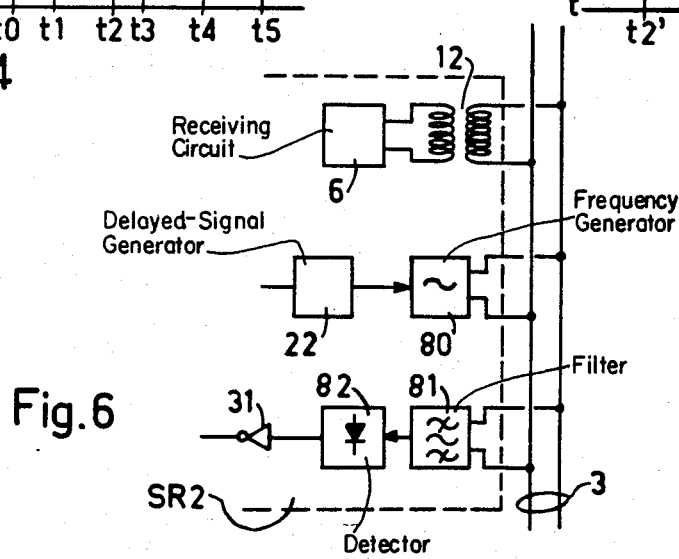
FIG. 6 shows another system according to the invention.

In FIG. 6, which is a variant of the system, elements corresponding to the elements of FIG. 1 have been given the same reference numerals.

The system of FIG. 6 no longer requires the transmission of the d.c. voltage component at the level of line 3. The d.c. voltage component prevents the use of transformers or even of amplifiers along this line. The system comprises a generator 80 having a frequency which is outside the spectrum of the useful information. This generator transfers this frequency to line 3 when the signal C at the output of the generator 22 assumes the value "1". Furthermore, a filter 81 has been provided whose response curve is centred at this same frequency. A detector 82 which supplies a signal "1" as soon as the level of the signal is sufficient at this frequency is arranged immediately behind this filter.

What is claimed is:

1. In a receiving system for transmitting information from a mobile station to a fixed central station via one sub-station out of a plurality of sub-stations connected to the central station by means of a transmission line wherein each sub-station comprises, a radio receiving circuit having an output coupled to the transmission line, a device for measuring the quality of a received signal and having an output connected to a first input terminal of a delayed-signal generator, said delayed-signal generator having a second input terminal and an output terminal, a switching device for coupling the output terminal of the delayed-signal generator to the transmission line for applying a rest condition signal developed at said output terminal to the other sub-stations via said transmission line and further coupling said second input terminal of the delayed-signal generator to the transmission line for applying a rest condition signal, generated by one of the other sub-stations, to the said one sub-station and for isolating the second input terminal of the delayed-signal generator from a rest condition signal appearing at said output terminal of the delayed-signal generator, and means further connecting the output terminal of the delayed-signal generator to an input of the receiving circuit for applying a signal thereto for releasing the receiving circuit.

2. A receiving system as claimed in claim 1 wherein the delayed-signal generator comprises a voltage-controlled oscillator having a control terminal for setting the time delay of the delayed-signal generator and a counter for counting the pulses of a signal produced by the oscillator and for generating an "end-of-count" signal.

3. A receiving system as claimed in claim 2, wherein the delayed-signal generator further comprises a flip-flop having an input coupled to the counter for the registration of the end-of-count signal, and wherein an output of the flip-flop comprises the output terminal of the generator.

4. A receiving system as claimed in claim 1 wherein the transmission line comprises a symmetrical line having two wires and wherein each sub-station receiving circuit is conneced to the line via a connecting transformer having a secondary winding which comprises a center tap connected to a said terminal of said switching device which has three terminals, means connecting a second terminal of said switching device to the output of the delayed-signal generator and a third terminal thereof to the second input terminal of the delayed-signal generator, said switching device being operative to transfer the rest condition signal of the delayed-signal generator of the one sub-station from the second terminal thereof to the first terminal thereof and to transfer the rest condition signal of one of the other sub-stations from the first terminal of said switching device to the third terminal thereof.

5. In a receiving system for transmitting information signals between a mobile station and a fixed central station via one selected sub-station out of a plurality of sub-stations coupled to the central station via a transmisson line, each sub-station comprising, a radio receiving information circuit for receiving signals having intelligence thereon and having an output coupled to said transmission line for supplying received information signals to the central station, a delayed-signal generator having first and second input terminals and first and second output terminals, means coupled to the receiving circuit for deriving a control signal determined by the amplitude of a received signal and an output coupled to said first input terminal of the delayed-signal generator, means for coupling the transmission line to the second input terminal of the delayed-signal generator for applying thereto a rest condition signal generated by one of the other sub-stations, and wherein said coupling means includes means coupling the first output terminal of the delayed-signal generator to the transmission line for applying a rest condition signal to the other sub-stations coupled to said transmission line in a manner such that the second input terminal of the delayed-signal generator is isolated from said rest condition signal when it appears at said first output terminal, and means connecting the second output terminal of the delayed-signal generator to an input of the receiving circuit for controlling the transmission of information signals through said receiving circuit.

6. A receiving system as claimed in claim 5 wherein the delayed-signal generator of each sub-station further comprises, means responsive to said control signal for generating a periodic signal whose frequency is determined thereby, counting means having an input coupled to the output of the signal generating means and an output, a first bistable circuit having an input coupled to the output of the counting means and first and second output terminals that comprise the first and second output terminals of the delayed-signal generator, and a second bistable device having an input coupled to the second input terminal of the delayed-signal generator and an output coupled to control the operation of the signal generating means and the counting means.

7. A receiving system as claimed in claim 5 wherein each sub-station further comprises, a threshold device having an input coupled to receive the control signal and an output coupled to a third input terminal of the delayed-signal generator for further controlling the operation thereof, and said coupling means includes a switching circuit having a first terminal coupled to the transmission line, a second terminal coupled to the first output terminal of the delayed-signal generator and a third terminal coupled to the second input terminal of said delayed-signal generator.

8. In a receiving system for transmitting information from a mobile station to a fixed central station via one sub-station out of a plurality of sub-stations connected to the central station by means of a transmission line wherein each sub-station comprises, a radio receiving circuit having an output coupled to the transmission line, a device for measuring the quality of a received signal and having an output connected to a first input terminal of a delayed-signal generator, said delayed-signal generator having a second input terminal and an output terminal, a frequency generator, means including said frequency generator for coupling the output terminal of the delayed-signal generator to the transmission line for applying a rest condition signal to the other sub-stations, means coupling the second input terminal of the delayed-signal generator to the transmission line via a frequency detection device for applying a rest condition signal, generated by one of the other sub-stations, to said one substation, and means further connecting the output terminal of the delayed-signal generator to an input of the receiving circuit for applying a signal thereto for releasing the receiving circuit.

* * * * *

UNITED STATES PATENT AND TRADEMARK OFFICE
CERTIFICATE OF CORRECTION

PATENT NO. : 4,293,954
DATED : October 6, 1981
INVENTOR(S) : JEAN-PIERRE VILATTE It is certified that error appears in the above—identified patent and that said Letters Patent is hereby corrected as shown below:

Column 7:

Claim 5, line 6, after "ing" delete "information" and after "receiving" insert --information--

Signed and Sealed this

Thirteenth Day of December 1983

[SEAL]

Attest:

GERALD J. MOSSINGHOFF

Attesting Officer

Commissioner of Patents and Trademarks